United States Patent [19]
Fulling et al.

[11] Patent Number: 5,515,385
[45] Date of Patent: May 7, 1996

[54] DEVICE AND METHOD FOR LIMITING DELAY BY SUBSTANTIAL ELIMINATION OF DUPLICATE SYNCHRONOUS DATA FRAMES IN A COMMUNICATION SYSTEM

[75] Inventors: Frank J. Fulling, Attleboro; William A. Neagle, Stoughton, both of Mass.

[73] Assignee: Motorola, Inc., Schaumburg, Ill.

[21] Appl. No.: 209,085

[22] Filed: Mar. 9, 1994

[51] Int. Cl.[6] .......................... G08C 25/02; H04L 1/18; H04J 3/14; H04J 3/24
[52] U.S. Cl. ........................ 371/32; 370/17; 370/94.1
[58] Field of Search ........................ 371/32, 41; 370/17, 370/94.1, 108, 109, 110, 118; 375/8; 341/50, 51, 60, 61

[56] References Cited

U.S. PATENT DOCUMENTS

| | | | |
|---|---|---|---|
| 4,970,714 | 11/1990 | Chen et al. | 370/94.1 |
| 5,200,962 | 4/1993 | Kao et al. | 371/41 |
| 5,384,780 | 1/1995 | Lomp et al. | 370/94.1 |

Primary Examiner—Roy N. Envall, Jr.
Assistant Examiner—Emmanuel L. Moise
Attorney, Agent, or Firm—Darleen J. Stockley

[57] ABSTRACT

The method (100, 200) and data communication equipment (300, 400) utilizing the method to substantially eliminate duplicate synchronous data frames thus limiting delay for a synchronous data system having error correcting protocol. Duplicate synchronous data frames are eliminated for timeouts where a communication channel becomes unusable for timeout that exceeds a preselected value.

3 Claims, 3 Drawing Sheets

100

200

300

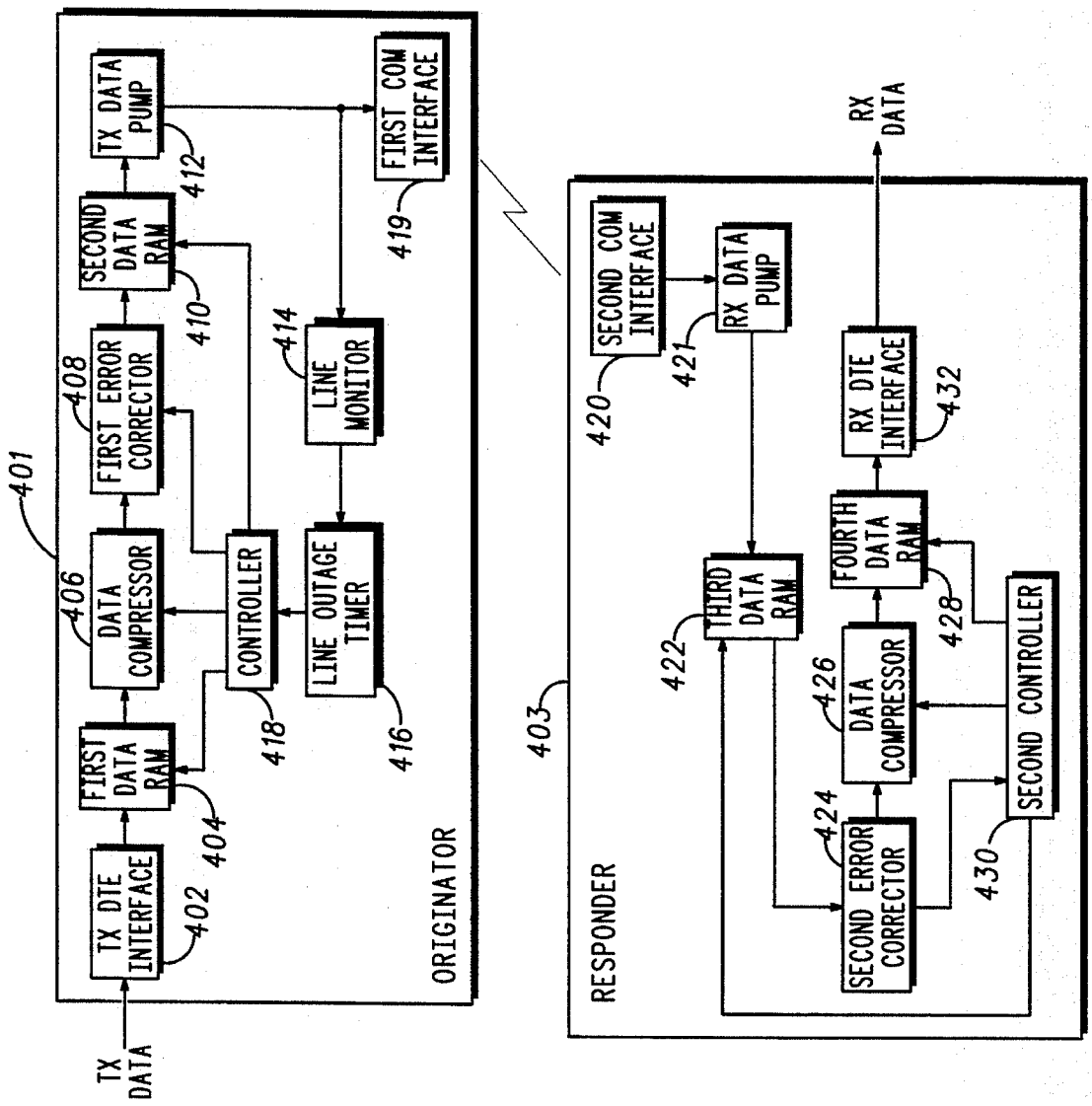

DEVICE AND METHOD FOR LIMITING DELAY BY SUBSTANTIAL ELIMINATION OF DUPLICATE SYNCHRONOUS DATA FRAMES IN A COMMUNICATION SYSTEM

FIELD OF THE INVENTION

This invention relates generally to synchronous data communication and, more particularly, to data delay within a synchronous data communication system.

BACKGROUND

Data communication, the movement of encoded information from one point to another by means of a transmission system, provides for communication that is often more efficient than telephone communication and that is especially efficient for transferring data from one location to another. Typically data is originated at data terminal equipment (DTE) such as a terminal or computer. The DTE converts the data to electronic signals and sends it to data communication equipment (DCE). The DTE may also be selected to receive data. Data communication equipment (DCE) is coupled between the DTE and a transmission medium, typically a telephone line, cellular network, a fiber optic line, or a satellite network, for manipulating the signals or data. Interfaces, i.e., shared boundaries, translate the characteristics of one piece of equipment to a next.

Information sent by a transmitter DTE (TX DTE) to a receiver DTE (RX DTE) consists of a sequence of bits (e.g., 0's or 1's). Clock signals are used to synchronize data transmission between the DCE and the DTE. In addition, synchronous error correcting protocols are used to provide error free data transmission between the receiving DTE and the transmitting DTE. These protocols frame blocks of data and imbed control information that defines an order, destination address and cyclic redundancy checksum for the data in the frame. The receiving DTE acknowledges which frames have been successfully received. The control information as well as the acknowledgments allow for detecting bit errors in a data frame or loss of data frame(s) between the transmitting DTE and the receiving DTE. Since the data in the DTEs using a synchronous error correcting protocol is buffered, lost data frame(s) can be retransmitted, providing error free data communications between the transmitting DTE and the receiving DTE.

Most synchronous error correcting protocols only allow a finite amount of time between transmitting a frame and receiving an acknowledgment for that frame. This finite amount of time is defined with respect to the maximum delay through the network. If a frame is not acknowledged within that finite time, the protocol causes it to be retransmitted. Some synchronous data communication equipment within a network can add additional delay. This equipment may buffer the synchronous data for an amount of time that causes the maximum delay to exceed what the synchronous protocols expect. For example, this typically occurs when a communications channel used by the equipment becomes unusable for an extended time. The end result is that the synchronous protocols timeout while waiting for the acknowledgment of the buffered frames, and then retransmit the frames. Meanwhile, the original frames are still in the network, buffered in the equipment while the communications channel is unusable. Once that channel is restored, the original frames, as well as the retransmitted frames, will be forwarded. This results in a number of negative results: synchronous protocols may become confused by duplicate frames and duplicate frames unnecessarily use bandwidth.

Thus, there is a need for a device and method for limiting delay for a synchronous data system having error correcting protocol by selectively eliminating duplicate synchronous data frames.

BRIEF DESCRIPTIONS OF THE DRAWINGS

FIG. 4 is a block diagram of a second embodiment of two data communication equipment devices (DCEs) for limiting delay for a synchronous data system in accordance with the present invention.

DETAILED DESCRIPTION OF A PREFERRED EMBODIMENT

The present invention provides a device and method substantially eliminating duplicate synchronous data frames in DCEs, thus limiting delay for a synchronous data system having an error correcting protocol. This invention minimizes synchronous protocol problems with duplicate data frames due to communication channel inoperability for a time that exceeds a predetermined delay time. In addition, this invention optimizes the use of available bandwidth.

In the following description, an "RX" prefix indicates a receiver, and a "TX" prefix indicates a transmitter.

Figure 1:
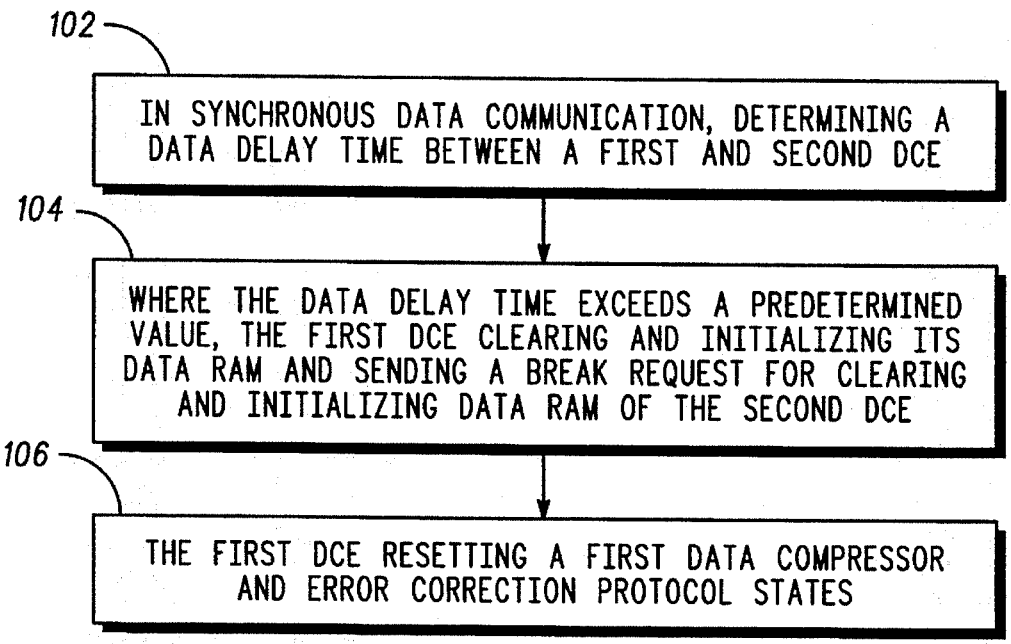
FIG. 1 is a flow chart illustrating the general sequence of steps of a first embodiment of a method for limiting delay for a synchronous data system in accordance with the present invention.

FIG. 1, numeral 100, is a flow chart illustrating the general sequence of steps of a first embodiment of a method for limiting delay for a synchronous data system in accordance with the present invention, i.e., typically from first DCE (data communication equipment) to second DCE. The method includes the steps of: (1) determining a data delay time between the first and second DCEs (102), and (2) where the delay time exceeds a predetermined value, the first DCE clearing and initializing data RAM (i.e., data RAM 304 and 310 of FIG. 3, data RAM 404 and 410 of FIG. 4) of the first DCE and sending a break request for clearing and initializing data RAM (i.e., data RAM of remote DCE 322 of FIG. 3, data RAM 422 and 428 of FIG. 4) of the second DCE (104), and 3) the first DCE resetting a first data compressor and error correction protocol states (106). Thus, duplicate data frames are eliminated. RAM is random access memory.

Figure 2:
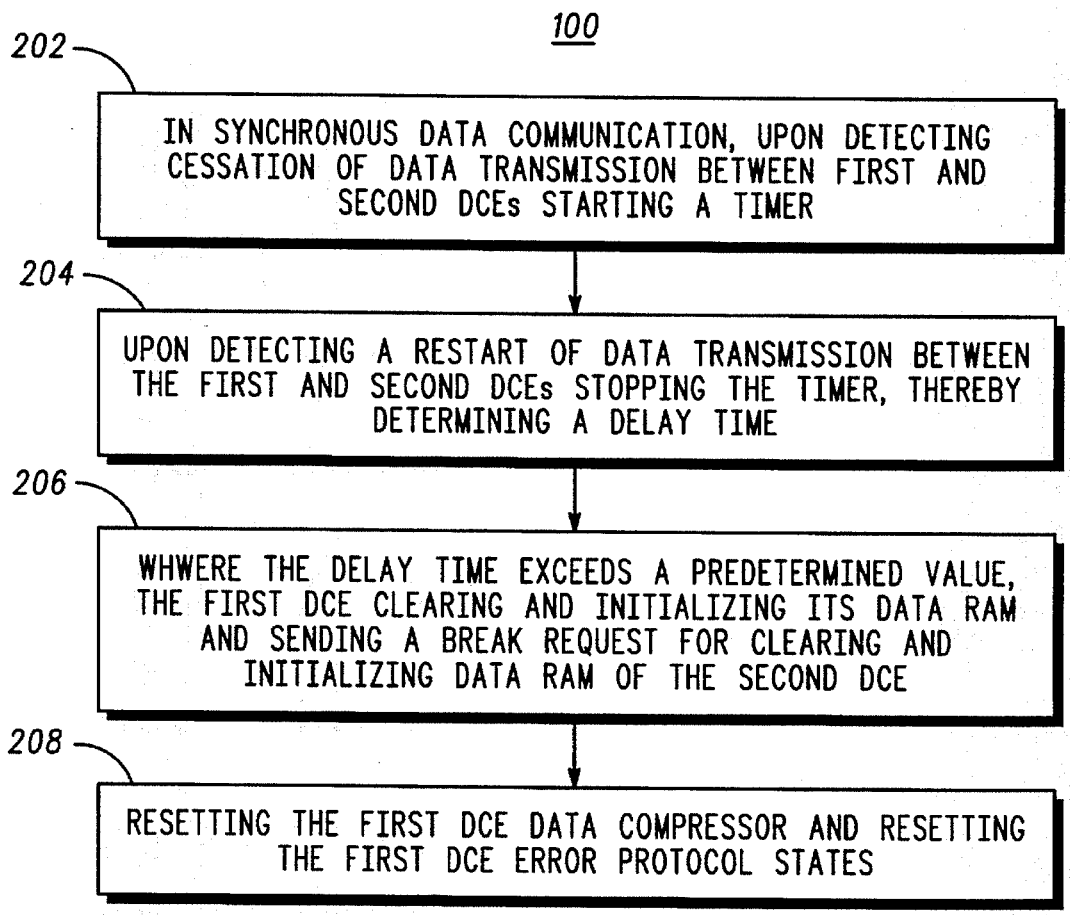
FIG. 2 is a flow chart illustrating the general sequence of steps of a second embodiment of a method for limiting delay for a synchronous data system in accordance with the present invention.

FIG. 2, numeral 200, is a flow chart illustrating the general sequence of steps of a second embodiment of a method for limiting delay for a synchronous data system in accordance with the present invention. The method substantially eliminates duplicate synchronous data frames to limit the maximum delay. The method includes the steps of: (1) upon detecting cessation of data transmission between the first and second DCEs, starting a timer (202), (2) upon detecting a restart of data transmission between the first and second DCEs, stopping the timer and determining a delay (204), and (3) where delay exceeds a predetermined value, the first DCE clearing and initializing data RAM of the first DCE and sending a break request for clearing and initializing data RAM of the second DCE (206), 4) resetting the first DCE data compressor and resetting first DCE error correction protocol states (208). As in the first embodiment, duplicate data frames are eliminated.

Figure 3:
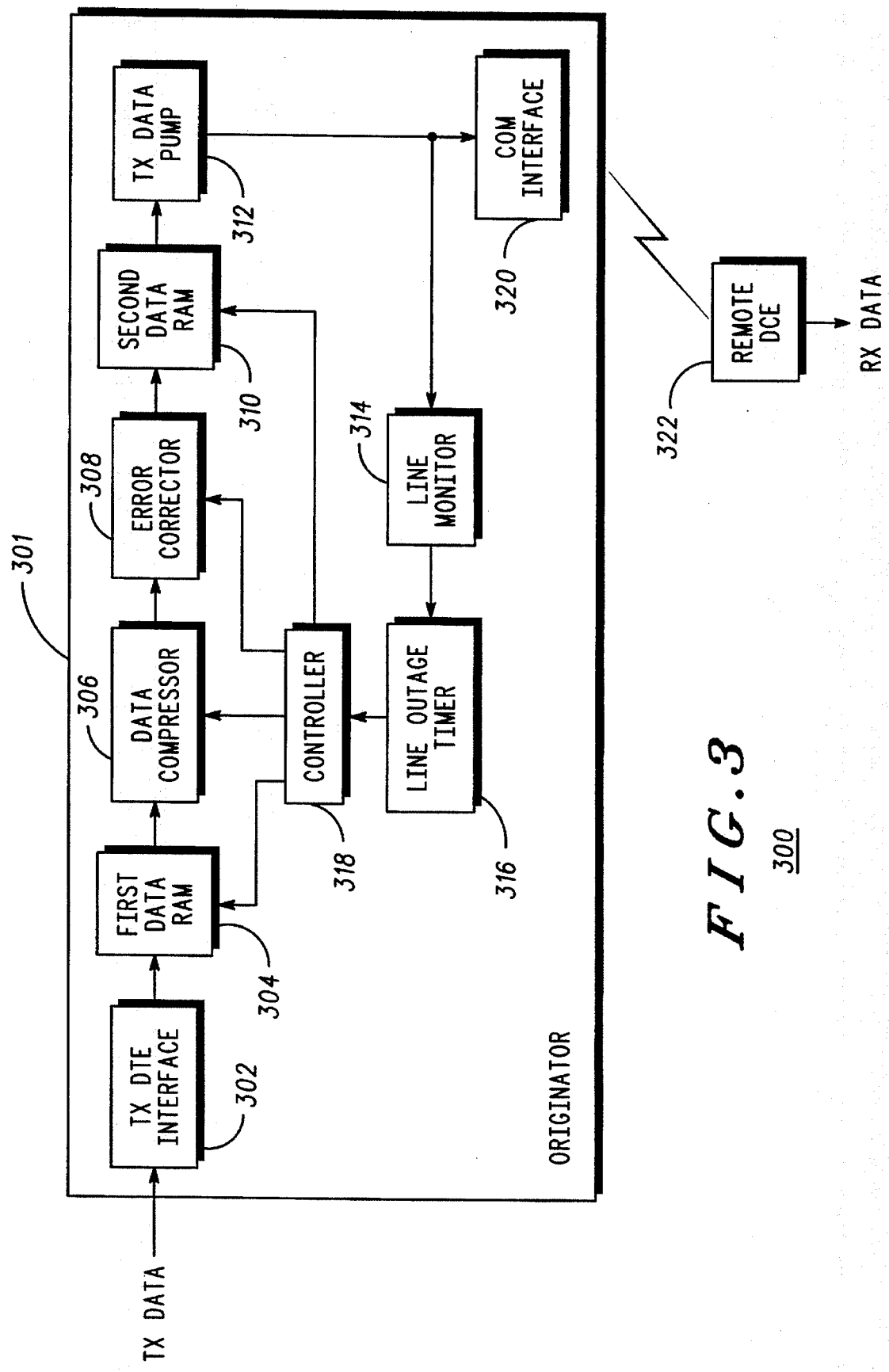
FIG. 3 is a block diagram of a first embodiment of two data communication equipment devices (DCEs) for limiting delay for a synchronous data system in accordance with the present invention.

FIG. 3, numeral 300, is a block diagram of two data communication equipment devices (DCEs) for limiting delay of synchronous data in accordance with the present invention. The data communication equipment (DCE) for limiting a maximum delay for synchronous data, includes a first DCE (301) that includes a (transmit) data terminal equipment interface (TX DTE INTERFACE) (302), first random access memory (FIRST DATA RAM) (304), a data compressor (306), an error corrector (308), second random access memory (SECOND DATA RAM) (310), a transmission data pump (312), a communication interface (COM INTERFACE, 320), a line monitor (314), a line outage timer (316), and a controller (318), wherein the first DCE (ORIGINATOR, 301) is operably coupled to a remote (RESPONDER) DCE (322). The data compressor typically includes an encoder and a decoder.

The data terminal equipment interface (TX DTE INTERFACE) (302) is operably coupled to receive the data for synchronous transmission from an external data source. The first random access memory (FIRST DATA RAM) (304) is operably coupled to the TX DTE interface (302) and to the controller (318) and is used for buffering data to be forwarded to a data compressor and, in response to a first control signal from the controller, clearing and initializing buffered data in the FIRST DATA RAM (304).

The data compressor (306) is operably coupled to the FIRST DATA RAM (304) and to the controller (318) and is used for compressing the buffered data in accordance with a predetermined compression scheme and, in response to a second control signal from the controller (318), clearing and reinitializing the data compression scheme. The error corrector (308) is operably coupled to the data compressor (306) and to the controller (318). A third control signal from the controller (318) is used for resetting the error corrector and initiating the transmission of a break request to the remote DCE (320). The second RAM (SECOND DATA RAM) (310) is operably coupled to the error corrector (308) and the controller (318). The second RAM buffers data for forwarding to a transmission data pump, and, in response to a fourth control signal from the first controller, clears and initializes the SECOND DATA RAM. The FIRST RAM (304), the data compressor (306), the error corrector (308) and the SECOND DATA RAM (310) are reset (cleared and initialized) bidirectionally. Thus, clearly this invention may be implemented for bidirectional flow of data, i.e., each DCE may be configured as an ORIGINATOR and a RESPONDER.

A "data pump" as used herein is defined as a data transmission/reception device capable of transmitting and receiving data to/from a communication channel, e.g., to a telephone line.

The transmission data pump (312) is operably coupled to the second RAM (308) and is used for facilitating transmission of the data. The first communication interface (320) is operably coupled to the transmission data pump (312) and is used for transmitting the data to the remote DCE (322). The line monitor (314) is operably coupled to the transmission data pump (312) and is used for, upon determining that data transfer between the error corrector (308) and the remote DCE (322) has ceased, sending a first signal to a line outage timer (316) signaling the line outage timer (316) to start timing. In addition, the line monitor (314), upon determining that data transfer between the error corrector (308) and the remote DCE (322) has restarted, sending a second signal to the line outage timer (316) signaling the line outage timer (316) to stop timing. The line outage timer (316) initiates the reset process by sending a reset signal to the controller (318): where the line monitor (314) sends a stop signal to the line outage timer (316) before a predetermined time, the line outage timer ((316) refrains from sending a reset signal to the controller; and where the line monitor (314) sends a stop signal to the line outage timer (316) after the predetermined time, the line outage timer sends the reset signal to the controller. The controller sends a first control signal to the first RAM (304) to clear and initialize the first RAM (304), sends a second control signal to the data compressor (306) to reset the data compressor (306), sends a third control signal to the error corrector (308) to reset the error corrector (308), initiates the sending of a break request to the remote DCE (322) to clear and initialize the data RAM of the remote DCE (322), and sends a fourth control signal to the second RAM (410) to clear and initialize the second RAM (410).

The second control signal resets the data compressor (306) in accordance with a predetermined reset scheme. The predetermined reset scheme is typically as defined in CCITT Recommendation V.42bis.

The third control signal constrains the error corrector (308) to reset and to transmit a break request to the remote DCE upon the first DCE detecting that the delay time exceeds a predetermined value.

Upon receiving the break request from the first DCE, the remote DCE (320) clears and initializes data RAM of said remote DCE.

FIG. 4, numeral 400, is a block diagram of a second embodiment of two data communication equipment devices (DCEs) for limiting delay of synchronous data in accordance with the present invention. The first DCE (ORIGINATOR) is as described above, but is repeated here with slightly changed naming to differentiate units of the ORIGINATOR (401) from similar units in the remote (RESPONDER) DCE (403).

The first DCE (401) that includes a (transmit) data terminal equipment (TX DTE) interface (402), first random access memory (FIRST DATA RAM, 404), a data compressor (406), a first error corrector (408), a second random access memory (SECOND DATA RAM, 410), a transmission data pump (412), a first communication interface (FIRST COM INTERFACE)(419), a line monitor (414), a line outage timer (416), and a first controller (418), wherein the first DCE (ORIGINATOR) (401) is operably coupled to a remote DCE (TARGET) (403). These elements operate as described above. The remote DCE (403) includes a second communication interface (SECOND COM INTERFACE, 420), a receiving data pump (421), a third RAM (THIRD DATA RAM, 422), a second error corrector (424), a data decompressor (426), fourth RAM (FOURTH DATA RAM, 428), and a receiving data terminal equipment (RX DTE) interface (432).

The second communication interface (420) is operably coupled to the first communication interface (419) and is used for receiving the data at the remote DCE (403). The receiving data pump (421) is operably coupled to the second communication interface (420) and is used for forwarding data to the third RAM (422). The third RAM is operably coupled to the second error corrector (424) and to the second controller (430) for buffering data to be forwarded to the second error corrector (424) and for, in response to a fifth control signal from the second controller (430) that is generated in response to a break request, clearing and initializing the THIRD DATA RAM. The second error corrector (424) is operably coupled to the data decompressor (426) for forwarding data to the data decompressor (426) and upon detecting a break request, resetting transmit and receive protocol states of the error corrector and forwarding the break indication to the second controller (430).

The data decompressor (426) is operably coupled to the second error corrector (424) and to the second controller (430) and is used for decompressing the data in accordance with a predetermined decompression scheme to provide decompressed data, and, in response to a sixth control signal from the second controller (430) that is generated in response to the break request, reinitializing the data decompressor (426) in accordance with a predetermined reset scheme. The predetermined reset scheme is typically that of CCITT Recommendation V.42bis.

The fourth RAM (FOURTH DATA RAM, 428) is operably coupled to the data decompressor (426) and to the second controller (430) for buffering data and, in response to a seventh control signal from the second controller (430) that is generated in response to the break request, clearing and initializing the fourth data RAM (428). The receiving data terminal equipment (RX DTE) interface (432) is operably coupled to the fourth RAM (428) and is used for outputting received data.

Thus, the remote DCE eliminates duplicate frames by clearing and initializing data RAM in response to a break request of the first DCE when a predetermined delay propagation time is exceeded.

The line monitor (314, 414) detects predetermined changes in the state of a communications channel between DCEs. When a state that indicates data transfer may be made changes to a state that indicates no data transfer can take place, the line monitor (314, 414) signals the line outage timer (316, 416) to start. When the state changes back to a state in which data transfer may be made, the line monitor (314, 412) signals the line outage timer (316, 416) to stop. Typical states in which no data transfer may take place are those in which DCEs are resynchronizing. The line monitor operates only while a logical connection exists between the respective error correction functions of the first DCE (301; 401) and the remote DCE (322; 403).

The initiation of the break request function in the present invention may be implemented in only the transmitting DCE. For example, the DCE which is designated as the ORIGINATOR of the connection as specified by CCITT Recommendation V.42 may be utilized to initiate a break request. Alternatively, both DCEs may initiate a break request when data flows bidirectionally.

The line outage timer (316, 416) measures the duration of a line outage and signals the first controller (318, 418) when this duration exceeds a predetermined timeout value. The timer begins measurement of the line outage duration upon receipt of a start signal from the line monitor. The line outage timer (316, 414) ceases measurement of the line outage duration upon receipt of a stop signal from the line monitor (314, 412). If, prior to the receipt of a stop signal, the measured duration equals or exceeds the timeout value, the line outage timer (316, 414) sends a reset signal to the controller (318, 416) and restarts timing the line outage. This means that the controller may be signaled multiple times during a particular extended line outage.

The predetermined timeout value is selected to accommodate a maximum delay through the network utilized. Thus, said value is typically greater than or equal to the values of the timeouts being used by the synchronous protocols. The value of the timeout period may be fixed for all connections, fixed for a particular connection, or dynamic. The value of the timeout period may be automatically determined by a DCE, set by the user through a control interface, or both.

The controller (318, 418) is typically as described by CCITT Recommendations V.42 and V.42bis. In addition, the controller, upon receipt of a reset signal from the line outage timer, clears and initializes data buffers (RAM) in the DCE, sends a C_INIT initialization request (as defined by CCITT Recommendation V.42/V.42bis) to the data compressor (306, 406), and sends a L-SIGNAL request, of destructive form (as defined by CCITT Recommendation V.42/V.42bis) to the error corrector (308, 408).

The controller (318, 418), upon receipt of the L-SIGNAL indication from the error corrector, clears and reinitializes data buffers in the DCE, sends a C_INIT request (as defined by CCITT Recommendation V.42/V.42bis) to the data compressor (306, 406), with no break request to the DTE (as is normally done in an asynchronous application).

The data compressor (306, 406) typically process the C_INIT request as set forth in CCITT Recommendation V.42bis.

The error corrector (308, 408) processes the L-SIGNAL request, of destructive form, as described by the CCITT Recommendation V.42. In general, this L-SIGNAL request causes the error corrector to reset predetermined conditions and to transmit an unnumbered information (UI) frame encoded for a break request, of destructive form, to the remote DCE. In turn, the remote DCE's error corrector (424) processes the received UI frame and generates a L-SIGNAL indication, of destructive form, to its second controller (430) as described by CCITT Recommendation V.42.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. Data communication equipment (DCE) for limiting maximum delay for synchronous data transmission, comprising:

A) a data terminal equipment (TX DTE) interface, operably coupled to receive data for synchronous transmission from an external data source, B) first random access memory (RAM), operably coupled to the TX DTE interface and to a controller, for buffering data to be forwarded to a data compressor and, in response to a first control signal from the controller, clearing and initializing its data RAM, C) the data compressor, operably coupled to the first RAM and to the controller, for compressing the buffered data in accordance with a predetermined compression scheme to provide compressed data for transmission, and for, in response to a second control signal from the controller, initializing its data compression scheme, D) an error corrector, operably coupled to the data compressor and to the controller, for forwarding data to a second RAM and for, in response to a third control signal from the controller, resetting a transmit condition and transmitting a break request to a remote DCE (data communication equipment), E) the second RAM, operably coupled to the controller and to the error corrector, for buffering data for forwarding to a transmission data pump and for, in response to a fourth control signal from the controller, clearing and initializing its data RAM, F) the transmission data pump, operably coupled to the second RAM, for facilitating data transmission to a remote DCE utilizing a communication interface, G) the communication interface, operably coupled to the transmission data pump, for transmitting the data to the remote DCE, H) a line monitor, operably coupled to the transmission data pump, for:
   H1) upon determining that data transfer state between the transmission data pump and the remote DCE indicates that data transfer has ceased, sending a first signal to a line outage timer signaling the line outage timer to start timing,
   H2) upon determining that data transfer state between the transmission data pump and the remote DCE indicates that data transfer has restarred, sending a second signal to the line outage time signaling the line outage timer to stop timing, I) the line outage timer, operably coupled to the line monitor, for:
   I1) upon receiving a first signal from the line monitor, starting timing,
   I2) upon receiving a second signal from the line monitor, stopping timing,
   I3) where the time from starting to stopping exceeds a predetermined delay time, sending a reset signal to the controller,
   I4) where the time from starting to stopping is less than a predetermined delay propagation value, refraining from sending a reset signal, and J) the controller, operably coupled to the line outage timer for sending the first control signal, second control signal, third control signal, and fourth control signal, respectively to the first RAM, the data compressor, the error corrector, and the second RAM, for clearing and initializing the respective RAMs, for reinitializing the data compressor, and, for resetting a transmit and receive protocol state in, and indicating that a break request (to a remote DCE) is to be sent by, the error corrector.

2. The device of claim 1 wherein, in response to the break request from the error corrector, the remote DCE clears and initializes the data RAM of said remote DCE, and resets the remote DCE data compressor and remote DCE error corrector protocol states.

3. Data communication system for substantially eliminating duplicate synchronous data frames in DCEs, thereby limiting a maximum delay for synchronous data transmission, comprising:

a first DCE, comprising:

A) transmit data terminal equipment (TX DTE) interface, operably coupled to receive data for synchronous transmission from an external data source, B) first random access memory (RAM), operably coupled to the TX DTE interface and to a first controller, for buffering data to be forwarded and, in response to a first control signal from the first controller, clearing and initializing its data RAM, C) a data compressor, operably coupled to the first RAM and to the first controller, for compressing the buffered data in accordance with a predetermined compression scheme to provide compressed data for transmission, and, in response to a second control signal from the first controller, reinitializing its data compression scheme, D) a first error corrector, operably coupled to the data compressor and to the first controller, for forwarding data to a second RAM and for, in response to a third control signal from the first controller, resetting a transmit condition and transmitting a break request to a remote DCE (data communication equipment), E) the second RAM, operably coupled to the first controller and to the first error corrector, for buffering data for forwarding to a transmission data pump and for, in response to a fourth control signal from the first controller, clearing and initializing its data RAM, F) the transmission data pump, operably coupled to the second RAM, for facilitating transmission to a remote DCE utilizing a first communication interface, G) the first communication interface, operably coupled to the transmission data pump, for transmitting data to a second communication interface of the remote DCE, H) a line monitor, operably coupled to the transmission data pump, for:
   H1) upon determining that data transfer between the transmission data pump and a receiving data pump of the remote DCE has ceased, sending a first signal to a line outage timer signaling the line outage timer to start timing,
   H2) upon determining that data transfer between the transmission data pump and the receiving data pump of the remote DCE has restarted, sending a second signal to the line outage time signaling the line outage timer to stop timing, I) the line outage timer, operably coupled to the line monitor, for:
   I1) upon receiving a first signal from the line monitor, starting timing,
   I2) upon receiving a second signal from the line monitor, stopping timing,
   I3) where the time from starting to stopping exceeds a predetermined delay propagation value, sending a reset signal to the first controller,
   I4) where the time from starting to stopping is less than a predetermined delay propagation value, refraining from sending a reset signal, J) the first controller, operably coupled to the line outage timer for sending the first control signal, second control signal, third control signal, and fourth control signal, respectively to the first RAM, the data compressor, the error corrector, and the second RAM, for clearing and initializing the respective RAMs, for reinitializing the data compressor, and, for resetting a transmit and receive protocol state in, and indicating that a break request (to a remote DCE) is to be sent by, the error corrector, and a second DCE, comprising:

K) the second communication interface, operably coupled to the first communication interface, for receiving the data at the remote DCE and forwarding the data to a third RAM, L) a receiving data pump, operably coupled to the second communication interface, for facilitating forwarding the data to a third RAM, M) the third RAM, operably coupled to the receiving data pump and to a second controller, for buffering and for, in response to a fifth control signal from the second controller, clearing and initializing its data RAM, N) a second error corrector, operably coupled to the second controller and to the third RAM, for forwarding data to a second data decompressor and for forwarding the break indication to the second controller, and resetting error correction states upon receiving a break request, O) the second data decompressor, operably coupled to the second error corrector, to the second controller and to a fourth RAM, for decompressing the data in accordance with a predetermined decompression scheme to provide decompressed data, and for, in response to a sixth control signal, reinitializing its data decompression scheme, P) said fourth random access memory (RAM), operably coupled to the data second decompressor and to the second controller, for buffering data and for, in response to a seventh control signal from the second controller that is generated in response to the break indication, clearing and initializing the fourth data RAM, and Q) RX data terminal equipment (RX DTE) interface, operably coupled to the fourth RAM, for outputting received data.

* * * * *